Nov. 18, 1958 G. W. HOBBS 2,860,831

RADIX CONVERTER

Filed Dec. 21, 1953 4 Sheets-Sheet 1

Inventor:
George W. Hobbs,
by Claude A. Mott
His Attorney.

Inventor:
George W. Hobbs,
by [signature]
His Attorney.

Nov. 18, 1958 G. W. HOBBS 2,860,831

RADIX CONVERTER

Filed Dec. 21, 1953 4 Sheets-Sheet 3

Inventor:
George W. Hobbs,
by [signature]
His Attorney.

Inventor:
George W. Hobbs,
by [signature]
His Attorney.

United States Patent Office 2,860,831

Patented Nov. 18, 1958

2,860,831

RADIX CONVERTER

George W. Hobbs, Scotia, N. Y., assignor to General Electric Company, a corporation of New York Application December 21, 1953, Serial No. 399,283

35 Claims. (Cl. 235—61)

Figure 1:
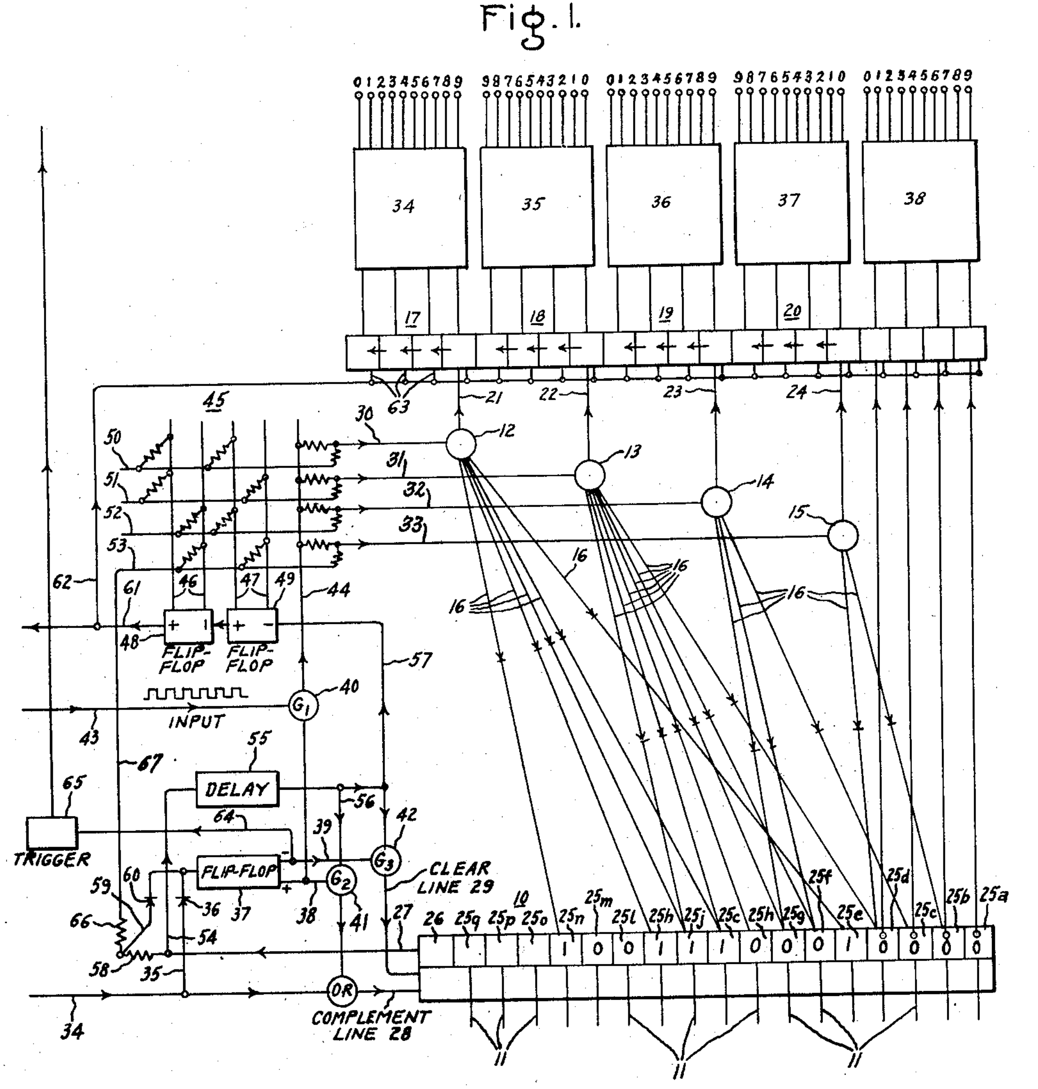

This invention generally relates to electronic digital calculating devices and more particularly to the portions of such devices for converting a number expressed in one radix to that of another, such as binary to decimal number converters.

With the ever increasing reliance being placed upon digital calculating machines to solve longer and more complex mathematical problems has resulted the evaluation of calculators of immense size having literally many thousands of parts and consuming tremendous quantities of power. Various means of simplifying the numerous and diversified arithmetic processes performed by these machines have long been sought; and it has been previously determined that the circuitry for performing these arithmetic functions may be greatly simplified in many instances by performing computations in the binary number system rather than in the decimal or other number system.

The representation of a number in binary notation, however, has the disadvantage of requiring more than three times as many digits as the representation of the same number in decimal notation. This fact coupled with the general familiarity in dealing with numbers in decimal form, renders it more desirable and expedient for the human operator to initially enter the problem in decimal number form into the machine and provide a means within the machine itself for converting this number into binary notation prior to performing the calculating functions. Such means have been termed by those skilled in the art as radix converters and where the numbered data in decimal form is converted into binary form, as decimal to binary converters. Similarly, it is desirable to have the results of calculations made by the machine operating in the binary number system reconverted or interpreted to the human operator in decimal number form. To this end a radix converter operating in the reverse direction and termed a binary to decimal converter is generally employed.

The present invention is directed toward providing such a converter for a high speed calculating device wherein a number represented in binary notation may be both automatically and instantaneously converted into decimal notation, or alternatively a number represented in decimal notation may be likewise converted into binary notation.

In accordance with one embodiment of the invention, a number represented in binary notation is initially entered into the device and stored therein. Thereafter this number is divided automatically and successively by the binary equivalent of each order of an integral 10's multiple number, beginning with the highest order 10's number dividable therein successively down to the lowest order 10's number. That is, assuming the number entered is the binary equivalent of number 1324, it is initially divided by the binary equivalent of the highest order 10's multiple number, which is the binary equivalent of 1000 in this instance, to yield a quotient of 1 and a remainder equal to the binary equivalent of 324. Binary remainder equivalent to 324 is then divided by the binary equivalent of the second highest order 10's multiple number, which is the binary equivalent of 100 to yield a quotient of 3 and a remainder equal to the binary equivalent of 24. Binary remainder equivalent to 24 is then divided by the binary equivalent of the third highest order 10's multiple number, which is the binary equivalent of 10 to yield a quotient of 2 and a remainder equal to the binary equivalent of 4. This process is automatically continued until the originally entered binary number is divided by all orders of the 10's multiple number contained therein, and upon completion of these division operations, the various quotients derived from this process, in this instance being 1, 3, 2, 4 represent the desired decimal number 1324.

It is accordingly one object of this invention to provide a high speed device for converting a number expressed in radix 2 to radix 10.

A further object is to provide a high speed automatically operating binary to decimal converter having no moving parts, A still further object is to provide an improved device for translating a number expressed in one radix to that of another, A further object is to provide an improved device for performing complementary addition.

Figure 2:
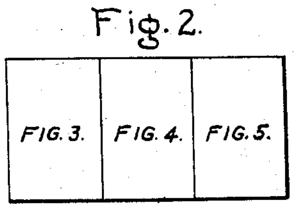
Figure 3:
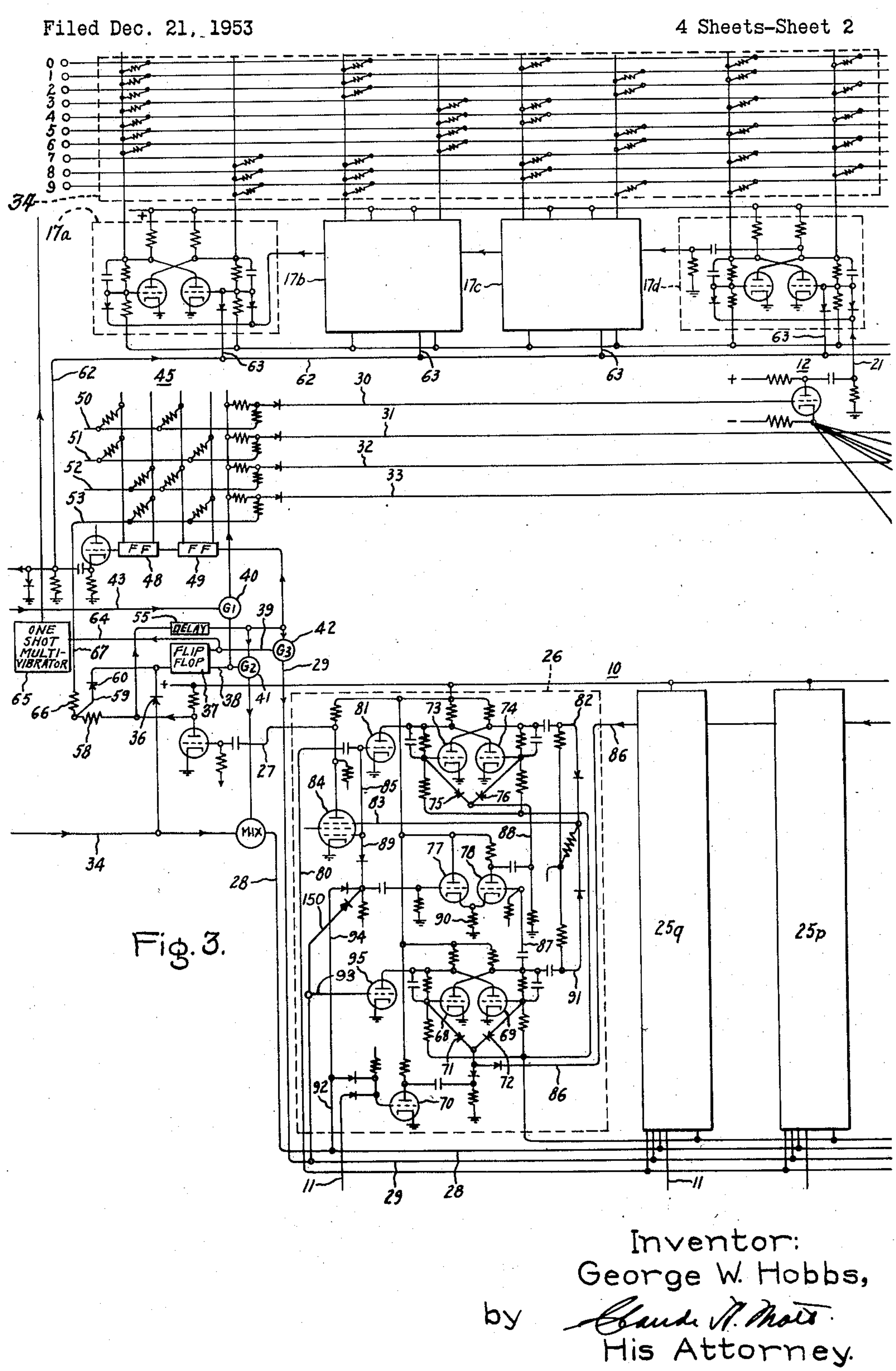
Figure 4:
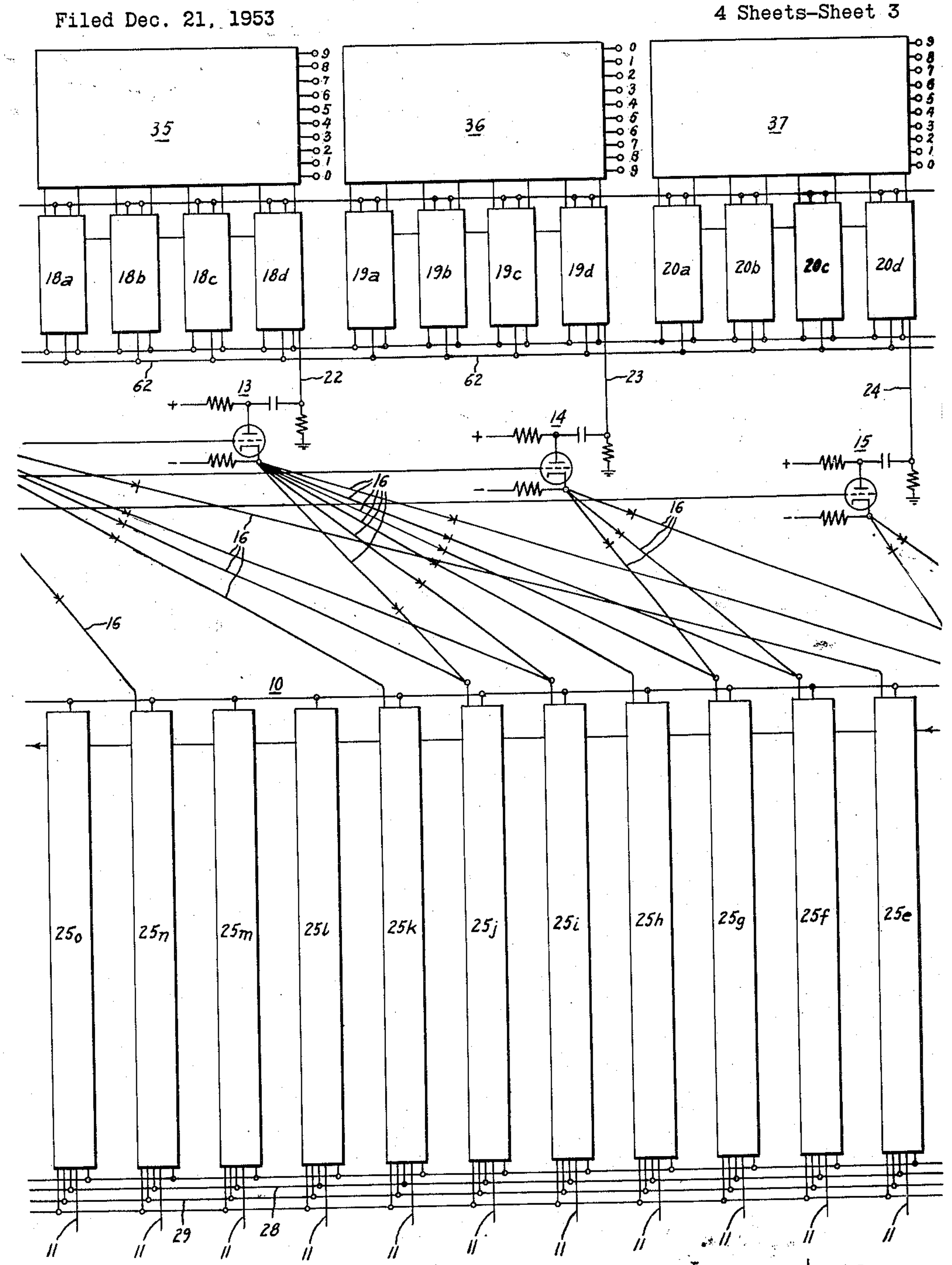
Figure 5:
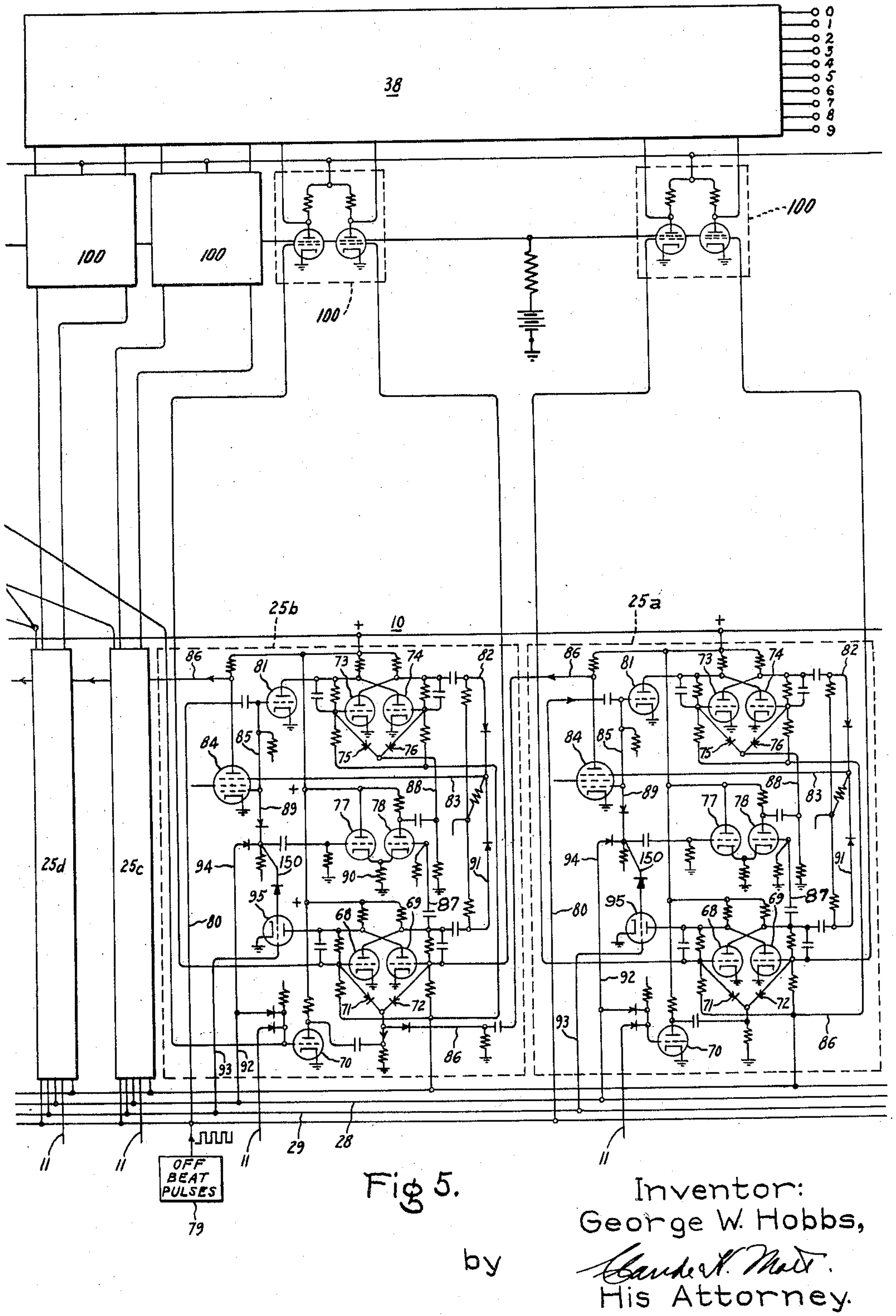

Other objects and many attendant advantages of this invention will be more readily comprehended to those skilled in this art upon a consideration of the following detailed description of one embodiment of the invention taken in conjunction with the accompanying drawings wherein:

Fig. 1 functionally illustrates a preferred embodiment of the invention, in block diagram form, Figs. 3, 4, and 5, placed in the side by side arrangement shown by Fig. 2, illustrate a system similar to Fig. 1 having portions of the circuitry schematically represented.

Prior to commencing a detailed description of a preferred embodiment of the invention, a more thorough comprehension thereof may be had by initially considering by way of example the mathematical basis for the operations performed. Considering that any five digit decimal number $a\ b\ c\ d\ e$ may be expressed as:

$$a\times 10^4+b\times 10^3+c\times 10^2+d\times 10^1+e\times 10^0$$

which is effectively the sum of the following four products and a decimal digit $e$, $$(a\times 10^4)+(b\times 10^3)+(c\times 10^2)+d\times 10)+e$$

The binary equivalent thereof may be found by initially determining the binary equivalent of each product and that of digit $e$, and thereafter summing these five binary numbers. Similarly, the binary equivalent of each above product may be obtained by determining the binary equivalent of each of the digits, $a$, $b$, $c$, $d$, and thereafter multiplying this binary number by the binary equivalent of its associated pure 10's miltiple number. That is, multiplying the binary equivalent of digit $a$ by the binary equivalent of $10^4$ or 10,000, etc.

Now assuming the reverse operation is desired wherein a number is given in binary form and it is desired to convert this number into decimal form. In this instance, considering that the binary number may be represented as the sum of a series of products plus the addition of a units digit; and that each of said products constitutes the result of multiplying an unknown decimal digit represented in binary form, by a known pure 10's multiple number represented in binary form, it is then only necessary to successively divide the given binary number by the different integral 10's multiple numbers (in binary form) to yield the desired digits $a$, $b$, $c$, and $d$, as quotients in binary form. This successive division being performed in the above example by initially dividing the original binary number by the binary equivalent of number 10,000 to derive digit $a$, then dividing the remainder thereof by the binary equivalent of number 1000 to derive digit $b$, etc. The final remainder after the completion of all divisions being therefore digit $e$.

As is well known in the art, however, the arithmetical processes of multiplication and division are most readily performed in digital computers by methods of reiterative addition and reiterative subtraction respectively. Therefore, in the above disclosed system for converting a number in binary notation to decimal notation, the various order of the 10's multiple number rather than being successively divided into the binary number, may each be successively subtracted from the binary number as may be more clearly comprehended by the following example. Assuming the binary number yielded by the machine is 111101011110110, and it is desired to convert this number into decimal form $a\ b\ c\ d\ e$. Initially in accordance with the above system, this number is first divided by the highest tens multiple number dividable therein, in this example being $10^4$ or 10,000, expressed in binary form as follows:

| Decimal | Binary |
|---|---|
| 10,000 | 10011100010000 |

Since the process of division may be performed by reiteratively subtracting the divisor from the dividend as many times as possible until the divisor exceeds the remaining number, this operation may be illustrated as follows:

| | | |
|---|---|---|
| | 111101011110110 | Unknown Number |
| (Subtract) | −10011100010000 | $10^4$ in Binary Form |
| | 101001111100110 | Result of First Subtraction |
| (Subtract) | −10011100010000 | |
| | 10110011010110 | Result of Second Subtraction |
| (Subtract) | −10011100010000 | |
| | 00010111000110 | Result of Third Subtraction |

Clearly, the remainder of this third subtraction, binary number 10111000110 is smaller than 10011100010000 (the binary equivalent of $10^4$). Consequently, since only three subtractions were required to reach this result, the first digit $a$ of the desired decimal number is 3.

Continuing this operation and now dividing this remainder by the next lowermost 10's multiple number $10^3$ or 1000 by the above method of reiterative subtraction.

| | Decimal 1000 | Binary 1111101000 |
|---|---|---|
| | 10111000110 | Remainder of First Division |
| (Subtract) | −1111101000 | $10^3$ in Binary Form |
| | 111011110 | Result of First Subtraction |

Since in this second division operation, the remainder (111011110) is smaller than 1111101000 (the binary equivalent of $10^3$) after only one subtraction, the second digit $b$ of the desired decimal number is observed to be 1.

Now dividing this latter remainder by the next lowermost pure 10's multiple number $10^2$ or 100.

| | Decimal 100 | Binary Equivalent 1100100 |
|---|---|---|
| | 111011110 | Remainder of Second Division |
| (Subtract) | −1100100 | $10^2$ in Binary Form |
| | 101111010 | Result of First Subtraction |
| (Subtract) | −1100100 | |
| | 100010110 | Result of Second Subtraction |
| (Subtract) | −1100100 | |
| | 10110010 | Result of Third Subtraction |
| (Subtract) | −1100100 | |
| | 1001110 | Result of Fourth Subtraction |

Since this latter remainder (1001110) is smaller than 1100100 (the binary equivalent of $10^2$) after four subtractions, this third digit $c$ of the desired decimal number is observed to be 4.

Now dividing this remainder by the next lowermost pure 10's multiple number 10′ or 10.

| | Decimal 10 | Binary Equivalent 1010 |
|---|---|---|
| | 1001110 | Remainder of Third Division |
| (Subtract) | −1010 | 10′ in Binary Form |
| | 1000100 | Result of First Subtraction |
| (Subtract) | −1010 | |
| | 111010 | Result of Second Subtraction |
| (Subtract) | −1010 | |
| | 110000 | Result of Third Subtraction |
| (Subtract) | −1010 | |
| | 100110 | Result of Fourth Subtraction |
| (Subtract) | −1010 | |
| | 11100 | Result of Fifth Subtraction |
| (Subtract) | −1010 | |
| | 10010 | Result of Sixth Subtraction |
| (Subtract) | −1010 | |
| | 1000 | Result of Seven Subtractions |

Here seven subtractions are required, and the fourth digit $d$ of the desired decimal number is thereby observed to be 7.

If the above process were strictly continued, this latter remainder 1000 would be diminished by the next lowermost pure 10's multiple number $10^0$ or 1. However, since the remainder, binary 1000, is known to be 8 in decimal form, eight subtractions of binary 0001 (equivalent to decimal 1) are required and the final digit $e$ of the desired decimal number is found to be 8.

Thus the original number in binary notation 111101011110110 has been converted to its decimal form 31478, which may be represented in accordance with the above analysis as the following summation.

$$(3\times 10^4)+(1\times 10^3)+(4\times 10^2)+(7\times 10')+(8\times 10^0)$$

Now while the mathematical method illustrated above constitutes the basis for the process followed by the invention to be subsequently described, a number of modifications thereof have been effected for simplifying the operation of the invention and enabling the radix conversion to be effected at higher speeds. One of these changes that has been found desirable is the elimination of the subtractive operations as such and the substitution therefor of complementary addition.

Complementary addition as formerly known in the art is an alternative manner of performing the subtractive process while actually adding a series of numbers. In this process for diminishing one number by another by addition, the complement of the subtrahend is initially obtained. Thereafter the minuend is added to the complemented subtrahend and the resulting sum after being recomplemented is equal to the difference of the two original numbers.

Upon considering that the complement of a number is closely related to the negative of that number, this process becomes readily comprehendable; for basic algebra teaches that the sum of a negative number and a positive number is equal to the difference of these numbers and therefore such an additive process is merely but another form of subtraction.

However, in prior devices employing complementing techniques for dividing one number by another rather than employing reiterative subtraction as illustrated above, the reiterative subtraction process is terminated when the number remaining after the prior operation is less than the number to be subtracted therefrom. Generally this is performed by actually effecting this latter subtraction, that is, enabling the larger number to be subtracted from the smaller number and providing means responsive to the negative result of this operation to reverse the operation one step and return the resulting negative number to its value prior to the latter subtraction. Those skilled in this art have termed this negative result an overdraft and hereinafter throughout this specification and claims the term overdraft will be employed to signify the difference number resulting from complementarily adding (subtracting) a large number from a smaller number. In the present invention, however, this additional operation of sensing the overdraft condition and thereafter returning this number to its value prior to overdraft is eliminated, and the overdraft number, itself, is employed in subsequent operations.

For facilitating a thorough comprehension of this unique form of complementary addition, an example of this operation is given below employing the same binary number (111101011110110) as above.

Taking the 1's (one's) complement of a binary number is quite simple inasmuch as all the 1's (one's) therein need only be replaced by 0's (zero's) and all the 0's (zero's) need only be replaced by 1's (one's). Then:

| | | |
|---|---|---|
| | 0111101011110110 | Binary Number to be Converted into Decimal Form |
| | 1000010100001001 | (1's) complement of this number |
| (add) | +10011100010000 | $10^4$ in Binary Form |
| | 1010110000011001 | Result of 1st Addition |
| (add) | +10011100010000 | |
| | 1101001100101001 | Result of 2nd Addition |
| (add) | +10011100010000 | |
| | 1111101000111001 | Result of 3rd Addition |
| (add) | +10011100010000 | |
| (overdraft) | 10010000101001001 | Result of 4th Addition |

The fourth addition of $10^4$ (in binary form) results in an overdraft being obtained as indicated by the leftmost digit of the resulting number in changing from a 0 (zero) to a 1 (one). Inasmuch as the present invention does not reverse one step after an overdraft, but rather employs the overdraft number; the true number of complementary additions is one less than the actual additions and the first decimal digit $a$ is therefore 3. This additional count is preferably automatically corrected for by counting the first addition as 0 (zero), the second addition as 1 (one), the third addition as 2 (two) etc.; yielding digit ($a$) as 3 upon the above overdraft being obtained.

Now continuing this operation by complementary addition of the binary equivalent of $10^3$ or 10,000.

| | | |
|---|---|---|
| | 0010000101001001 | First Overdraft |
| | 1101111010110110 | 1's Complement Thereof |
| (add) | +1111101000 | $10^3$ in Binary Form |
| | 1110001010011110 | Result of 1st Addition |
| (add) | +1111101000 | |
| | 1110011010000110 | Result of 2nd Addition |
| (add) | +1111101000 | |
| | 1110101001101110 | Result of 3rd Addition |
| (add) | +1111101000 | |
| | 1110111001010110 | Result of 4th Addition |
| (add) | +1111101000 | |
| | 1111001000111110 | Result of 5th Addition |
| (add) | +1111101000 | |
| | 1111011000100110 | Result of 6th Addition |
| (add) | +1111101000 | |
| | 1111101000001110 | Result of 7th Addition |
| (add) | +1111101000 | |
| | 1111110111110110 | Result of 8th Addition |
| (add) | +1111101000 | |
| (overdraft) | 10000000111011110 | Result of 9th Addition |

The ninth addition of $10^3$ (in binary form) results in an overdraft being obtained as indicated by the leftmost digit of the resulting number in changing from a 0 (zero) to a 1 (one). However, it is observed that the overdraft obtained after the first order of complementary additions (addition of $10^4$ in binary form) was again complemented before the addition thereto of $10^3$ (in binary form) above. Therefore the decimal digit ($b$) is obtained by counting the above additions in the reverse direction commencing with the digit 9. That s:

1st addition ............ Count 9
2nd addition ............ Count 8
3rd addition ............ Count 7

4th addition ............ Count 6
5th addition ............ Count 5
6th addition ............ Count 4
7th addition ............ Count 3
8th addition ............ Count 2
9th addition ............ Count 1

Thus the second decimal digit ($b$) is therefore 1.

This operation is then continued by taking the complement of the latter overdraft and adding $10^2$ (in binary form) thereto as follows:

| | | |
|---|---|---|
| | 0000000111011110 | Second Overdraft |
| | 1111111000100001 | 1's Complement Thereof |
| (add) | +1100100 | $10^2$ in Binary Form |
| | 1111111010000101 | Result of 1st Addition |
| (add) | +1100100 | |
| | 1111111011101001 | Result of 2nd Addition |
| (add) | +1100100 | |
| | 1111111101001101 | Result of 3rd Addition |
| | 1111111101001101 | |
| (add) | +1100100 | |
| | 1111111110110001 | Result of 4th Addition |
| (add) | +1100100 | |
| (overdraft) | 10000000000010101 | Result of 5th Addition |

Change of the leftmost digit from 0 (zero) to a 1 (one) again indicates overdraft after five additive operations, and therefore the digit $c$ of the desired decimal number is 4, counting again forwardly from 0 to 1 etc.

The complementary additions of $10'$ (in binary form) is then commenced after the latter overdraft is complemented as follows:

| | | |
|---|---|---|
| | 0000000000010101 | Second Overdraft |
| | 1111111111101010 | 1's Complement Thereof |
| (add) | +1010 | $10'$ in Binary Form |
| | 1111111111110100 | Result of 1st Addition |
| (add) | +1010 | |
| | 1111111111111110 | Result of 2nd Addition |
| (add) | +1010 | |
| (overdraft) | 10000000000001000 | Result of 3rd Addition |

Change of the leftmost digit from 0 (zero) to 1 (one) again indicates overdraft after three operations, and inasmuch as in every other complementary addition sequence the count is reversed starting with 9 to 8 to 7 etc., digit ($d$) of the desired decimal number is therefore 7.

Again the final remainder constituting the digit ($e$) of the desired decimal number may be obtained by an addition sequence of operations of the type above illustrated. However, since binary 1000 is known to be 8 in decimal form, nine complementary additions of binary 0001 are required and the final digit $e$ is found to be 8.

Thus the original number in binary notation

111101011110110 has again been converted to decimal form as 31478 employing the above unique form of complementary addition.

This above process may now be summarized as follows: After complementing the original binary number, the highest order pure 10's multiple number contained therein (in binary form) is reiteratively added thereto until an overdraft has been obtained. The number of additions of this high order number to accomplish overdraft is summed, initially commencing with the count of 0, thence forwardly to 1, 2, etc. This sum number constitutes the first digit of the decimal number desired. To derive the second highest decimal digit, the above obtained overdraft is again complemented and the second highest order 10's multiple number reiteratively added thereto until a second overdraft is obtained. Again the number of additions is summed; however, in this second step, commencing with the count of 9 and proceeding in the reverse direction to 8, 7, 6 etc. Continuing this procedure, the second overdraft is complemented and the third highest order 10's multiple number (in binary form) is added thereto in successive operations until overdraft is obtained. As in the first above sequence of operations, the third decimal digit ($c$) is derived by counting the number of successive additive operations forwardly commencing with 0 thence to 1, 2, 3 etc. This series of reducing operations (by complementary addition) is continued order by order until the original binary number is reduced to zero, and the resulting decimal digits are obtained by counting the number of addition operations by each order following the procedure outlined above. That is, by counting the first series of additions from the number 0 in the forward direction; the second series of additions from the number 9 in the reverse direction, and so forth.

Referring now to the block diagram of Fig. 1 for an over-all consideration of one preferred embodiment of the invention operating in accordance with the above process, a binary number to be converted into decimal form is initially entered into an accumulator generally designated 10 over a plurality of input lines 11 and stored therein. A plurality of number generators, generally designated 12, 13, 14, and 15 corresponding to the various orders of a multi-order integral 10's multiple number, are each associated with said accumulator by a plurality of lines 16 and adapted to enter therein the binary equivalent number of that order in additive relation with the number then stored. That is, generator 12 is adapted to additively enter the binary equvalent of $10^4$ or 10,000 (10011100010000); generator 13 is adapted to enter the binary equivalent of $10^3$ or 1000 (1111101000); generator 14 is adapted to enter a binary equivalent of $10^2$ or 100 (1100100); and generator 15 is adapted to enter the binary equivalent of $10^1$ or 10 (1010). Each of said number generators is further provided with a counting means generally designated 17, 18, 19, and 20 for recording the number of instances that the given order is entered into accumulator 10. Counting means 17 accordingly is associated with generator 12 over line 21 to sum the number of operations thereof; counting means 18 is associated with generator 13 over line 22 to sum the number of operations thereof; counting means 19 is associated with generator 14 over line 23 to sum the number of operations thereof; and counting means 20 is associated with generator 15 over line 24 to sum the number of operations thereof.

The remainder of the system illustrated in the far left of the figure generally comprises programming and control circuitry for energizing each of said number generators in turn to continuously and repetitively enter the binary equivalent of its respective order into said accumulator until an accumulator overdraft has been obtained, and for further complementing the number standing in the accumulator prior to the energization of each number generator. Thus, upon completion of all generator operations, the multidigit number standing in the various counting means 17, 18, 19, and 20 represents the decimal equivalent of the originally entered binary number.

Considering now each of the above components in more detail, accumulator 10 is preferably comprised of a plurality of cascaded counting stages 25$a$–25$q$, and 26, each stage operating in an on-off fashion or adapted to complete its cycle of operations in two steps and at the conclusion thereof to transfer or carry-over a pulse to the next succeeding stage. The last stage of this series generally designated 26 may be considered as the sign stage, that is, the stage generating an output pulse over line 27 at the time overdraft is obtained; and this stage being normally in the off or 0 (zero) condition produces this pulse as it is turned on, or enters into the 1 (one) condition. Initial entry of the binary number is preferably effected therefore by simultaneously entering pulses into the appropriate stages 25 over input lines 11 to turn on or place these appropriate stages in the 1 (one) condition. Similarly additional binary numbers may be added thereto in a simultaneous manner by energizing any one series of number generator output lines 16, whereby pulses directed over this series of lines are simultaneously entered into the accumulator stages connected thereto.

In addition to each of the separate input lines 11 and 16 for entering pulses individually into the stages, all of the stages together may be affected by the entry of pulses over two control lines; the complement line 28 and the clear line 29. A pulse conducted over complement line 28 operates on all of the stages together to reverse the condition of each. That is all the stages then in the 1 (one) or on condition are turned off to the 0 (zero) condition, and all of the stages then in the 0 (zero) or off condition are turned on to the 1 (one) condition. A pulse conducted over the second control line 29, however, performs the operation that its title designates, that is, clears all stages of the accumulator together, i. e., all stages then in the 1 (one) or on condition are turned off to the 0 (zero) condition, and all stages then in 0 (zero) or off condition are unaffected thereby and remain off.

Number generators 12, 13, 14, and 15, may each comprise a means responsive to each received input pulse for generating or transmitting a plurality of output pulses simultaneously to various accumulator stages over output lines 16. Highest order generator 12 therefore responds to each input pulse received over line 30 to simultaneously generate a plurality of output pulses over the lines 16 connected thereto, which latter lines are in turn connected to the input circuits of the fifth, ninth, tenth, eleventh, and fourteenth stages of the accumulator to enter pulses therein. Thus for each input pulse received over line 30, number generator 12 enters binary number 10011100010000 (as shown) into the accumulator. However, since this binary number is equivalent to the decimal number 10,000, each energization of generator 12 effects the entry of the binary equivalent of 10,000 into the accumulator. Similarly generator 13 responds to each energization from line 31, generator 14 to each energization from line 32, and generator 15 to each energization from line 33; each of these generators being operable in a similar manner to enter the binary equivalent of a different order 10's multiple number into the accumulator stages as may be determined by following the output lines 16 interconnecting these devices with the accumulator stages.

For determining the number of successive operations performed by each of the above mentioned generators, an additional output line therefrom transmits a pulse for every energizing pulse effecting the operation of the generator. These latter output pulses are in turn directed to counters for summing these operations. As shown by Fig. 1 output lines 21, 22, 23 and 24 each connect a different one of said generators 12, 13, 14 and 15 with counters 17, 18, 19 and 20 respectively to sum the total number of operations thereof.

Counters 17, 18, 19 and 20 may each comprise four cascaded binary counter stages, generally illustrated by the four partitioned boxes as shown, sequentially connected to complete their over-all cycle of operations after the receipt of 16 pulses or counts. Associated with each of said four stage binary counters may be a four input line-ten output line matrix diagrammatically illustrated by boxes designated 34, 35, 36 and 37 respectively for converting the various on-off conditions of each of these counting stages into the decimal count represented thereby. Connected to each of the ten output lines of each matrix may be numbered neon glow tubes, printing mechanisms, or other indication manifesting means for indicating or reading out the decimal count determined by each of said matrices.

Considering now the programming circuitry for enabling the systematic and repetitive functioning of the number generators in reducing the binary number stored in accumulator 25, and thereby deriving the decimal equivalent thereof as illustrated by the mathematical example given above; a starting pulse received over input line 34 at the lower left of the figure initiates the automatic operation as follows. This pulse operates upon the system to simultaneously perform two operations. In the first operation it is conveyed over line 34 through a two way circuit designated O R and accumulator complement line 28 to enter the accumulator and establish the complement of the binary number then standing therein, thereby readying the accumulator for the complementary additions to be subsequently commenced. In the second operation, this pulse is directed upwardly over vertical line 35 and thereafter through control circuitry, to be subsequently described, to enable the energization of the highest order number generator 12 over line 30 thereby enabling the commencement of the complementary addition operations.

Tracing the second path of this pulse for an understanding of this control circuitry and the manner of its operation; upon passing upwardly over vertical line 35, the pulse is directed through one way diode 36 to reverse the conducting condition of a double stability state flip flop circuit 37 enabling the lower output line 38 thereof to assume a more positive (+) potential as shown, and the upper output line 39 thereof to assume a more negative (—) potential as shown. Output lines 38 and 39 are connected to control the opening and closing of three gate circuits, gate $G_1$ numbered 40, gate $G_2$ numbered 41, and gate $G_3$ numbered 42. Therefore establishing lower output line 38 at a more positive value opens gates $G_1$ (40) and $G_2$ (41) connected thereto, and concurrently establishing output line 39 at a more negative potential closes gate $G_3$ (42). With gate $G_1$ (40) open, a series of input pulses from a repetitive energizing source (not shown) may be transmitted over line 43 through open gate $G_1$ to the vertically represented input line 44 of a line selector generally designated 45.

Line selector 45 comprises a circuit for enabling the signals over line 44 to be selectively directed over any one of output lines 30, 31, 32 or 33 to thereby energize any one of number generators 12, 13, 14 or 15 as desired. Consequently, should output line 30 be exclusively selected, pulses received over input 44 line are directed over line 30 to repetitively energize number generator 12 and thereby enable the repetitive entry of 10,000 (in binary form) into the accumulator. Similarly should output line 31 be exclusively selected, pulses received over input line 44 are directed over line 31 to repetitively energize number generator 13 and thereby enable the repetitive entry of 1000 (in binary form) into the accumulator. For enabling the exclusive selection of any one of these output lines desired, line selector 45 may be comprised of a control matrix, as shown, having two pairs of vertically arranged control lines 46 and 47 being variably energized by the condition of two double stability flip-flop circuits 48 and 49. Connected to these vertically arranged control lines by a predetermined arrangement of diodes, or resistors, as shown, are four horizontally arranged lines 50, 51, 52 and 53 each associated with a different output line 30, 31, 32 and 33, respectively, by a resistor. For each of the four possible conducting conditions of the two cascaded flip-flop circuits 48 and 49, the arrangement of the matrix permits one of the horizontal lines 50, 51, 52, or 53 to be positively energized and the others to be more negatively energized. This positive energization in effect conditions a related number generator input line to receive input pulses through a resistor, as shown, where upon source generated pulses conducted over matrix input line 44 are directed over this conditioned line to energize the related number generator. Referring to Fig. 1 for an illustrative example, flip-flop circuits 48 and 49 are each shown conditioned to their 0 (zero) or off position, that is, the left-hand line of each pair of vertically extending output lines connected thereto is positively energized relative to the right-hand line. Following these positively energized vertical lines to the matrix, it is observed that only the uppermost horizontal line 50 thereof is associated with both lines, whereas the remaining horizontal lines are connected to at least one of the more negative vertical lines. Consequently with flip-flops 48 and 49 both in this 0 (zero) condition, number generator input line 30 is the only line conditioned to receive the input pulses from line 44. Following this procedure for other conditions of control flip-flop circuits 48 and 49, it may be readily observed that for each succeeding different condition of the flip-flop circuits, the next succeeding number generator input line is conditioned to pass input pulses. That is for flip-flop 49 in the 1 (one) condition and flip-flop 48 in the 0 (zero) condition, (+ —) (— +), number input line 31 is conditioned to enable input pulses to energize number generator 13 etc.

Thus the entry of a start pulse over line 34 results in the complement of the number standing in the accumulator 25 being established, and additionally enables the highest order number generator 12 to commence operation.

Thereafter for each pulse received over line 44 through line selector 45, and line 30 to generator 12, a series of pulses are transmitted to the accumulator 25 adding the binary equivalent of number $10^4$ thereto; and the successive series of complementary additions continues until an overdraft has been obtained indicating that this first operation has been completed. Upon the overdraft being effected, a pulse is transmitted by the last stage 26 of the accumulator over line 27. This pulse is conducted upwardly over line 54 to circuit 55, designated by a block labeled delay, and after a given fixed interval of time has elapsed, it is employed to condition the system for the next complementary addition operation by performing two functions. The first of these functions is complementing the overdraft number then standing in the accumulator; and this is performed by directing the delayed pulse output from circuit 55 downwardly over line 56 through open gate $G_2$ to complement line 28 and thence to accumulator 25. The second function is terminating the operation of high order number generator 12 and initiating the operation of the next succeeding number generator 13; and this is performed by conducting the output signal from delay circuit 55 upwardly over line 57 to change the conducting condition of matrix control flip-flop circuit 49. Changing the condition of control flip-flop circuit 49, results in the matrix selecting the second number input line 31 for receiving the recurring pulses from line 44, thereby directing these pulses to number generator 13 rather than generator 12. For each of said recurring pulses received, generator 13 transmits the binary equivalent of decimal number $10^3$ or 1000 into the accumulator. This second operation is successively continued until an accumulator overdraft is obtained, whereupon delay circuit 55 again generates an output pulse to both complement the second overdraft number in the accumulator and energize the third order number generator 14 to commence operation.

The above process is similarly continued order-by-order in time sequence until the lowest order number generator, in this instance being generator 15, has completed its operations. Upon the last overdraft being obtained, an overdraft pulse is generated as before over line 27, however, this latter pulse is additionally directed through resistor 58, line 59 and one way diode 60 to flip-flop circuit 37 thereby effecting a reversal in the conducting condition thereof. Output line 38 of flip-flop circuit 37 is therefore reestablished to a more negative potential and output line 39 to a more positive potential resulting in gates $G_1$ and $G_2$ now being closed and gate $G_3$ now being opened. The closing of gate $G_1$ prevents input pulses conducted over line 43 from passing therethrough to energize the number generators, and therefore effectively terminates the operation of the system. Gate $G_3$ now being open allows the delayed overdraft pulse, originating from accumulator 25 (to line 54 and delay circuit 55), to pass therethrough and energize accumulator clear line 29 for clearing the accumulator. This delayed pulse is also directed upwardly over line 57, as before, to matrix flip-flop circuits 48 and 49, thereby completing their cycle of operations and returning them to the 0 (zero) condition, as shown. The return of flip-flop circuit 48 to its zero position (+ —), enables the generation of an output pulse over line 61 connected thereto. This pulse may be employed to reset the number generator counters 17, 18, 19 and 20 located at the upper portion of the figure by being directed upwardly over line 62 to enter the clear lines generally designated 63 for all of these units, as shown.

Should a printing or other permanent indicating mechanism be employed for recording the decimal number standing in the multi-order counters 17, 18, 19, 20 etc., it becomes necessary, of course, to actuate this mechanism prior to clearing these counters. To this end, a pulse may be taken from the output line 39 of control flip-flop circuit 37, as the conducting condition of this flip-flop is varied by the last overdraft pulse over line 59. As shown, this pulse may be directed over line 64 to a suitable triggering mechanism 65 for thereafter enabling the actuation of said recorder (not shown).

Returning briefly to Fig. 1 for an understanding of the manner by which the control flip-flop circuit 37 responds only to the last overdraft to effect the complete termination of the system operation, rather than responding to each overdraft pulse; the input line 59 over which said last overdraft pulse is conducted is connected to two circuit paths. The first of these paths transmits each overdraft pulse from line 27, whereas the second path leading through resistor 66 is connected by means of line 67 to the lowermost horizontal line 53 of line selector matrix 45. For an overdraft pulse to enter flip-flop circuit 37, it is necessary that the upper path receive a given positive potential, which in this instance may only be obtained when matrix control flip-flop circuits 48 and 49 are both in the 1 (one) or on condition. Consequently inasmuch as these circuits are in the 1 (one) condition only when the lowest order generator is performing its sequence of operations, overdraft pulses generated prior to this time are prevented from affecting the conducting condition of flip-flop circuit 37, whereas an overdraft pulse occurring at the termination of this interval is effective to reverse the condition of this circuit and thereby terminate the complete operation as discussed above.

Referring now to Figs. 3, 4, and 5 placed in the side-by-side arrangement, illustrated by Fig. 2, for a detailed understanding of the preferred circuitry employed in the present invention.

*Accumulator*

Accumulator 10 is basically comprised of a plurality of identical binary summing stages 25*a–q*, and 26 in cascaded connection, each stage adapted to count two pulses and after receipt of the second consecutive pulse to generate a carry-over pulse to the next succeeding stage. For summing these pulses each stage therefore includes a two step on-off flip-flop adding device such as the Eccles-Jordan connected vacuum tubes 68 and 69 adapted to alternately conduct in response to consecutive input pulses applied to their control grids. For enabling a plurality of input pulses from independent sources to be summed by said add flip-flop tubes 68 and 69, an isolating tube 70 is provided as a mixer, for receiving these input pulses over the control grid thereof and transmitting these pulses from the plate circuit thereof to the junction of two rectifier or diode elements 71 and 72. Thus for any positive pulse transmitted to the control grid of mixer tube 70, whether from outside input line 11, number generator line 16, or complement line 28, add flip-flop tubes 68 and 69 coincidentally receiving this pulse, reverse their then conducting condition.

For enabling the second function performed by these stages to be effected, that of carry-over from each stage to the next stage after the receipt of the second input pulse; a second flip-flop circuit, hereinafter termed the carry flip-flop and comprising tubes 73 and 74, is provided. This carry flip-flop circuit may be identical to the add flip-flop circuit, as shown, and therefore each pulse transmitted to the junction of diodes 75 and 76 operates to reverse the conducting and nonconducting condition of tubes 73 and 74 respectively.

Inasmuch as the entry of pulses over input lines 11 or number generator lines 16 to the various stages 25 of accumulator 10 are effected simultaneously, the carry-over pulses from stage to stage are preferably effected in the time interval occurring between said input pulses to thereby prevent interference between input and carryover pulses. For this purpose gating means including tubes 77 and 78 are provided intermediate the add and carry flip-flop circuits to isolate these devices during the carry process, and a source of off-beat pulses 79, generating a continuous sequence of carry clear pulses occurring in time sequence intermediate the add pulses, is provided to initiate this carry-over process. Thus, during the time interval between add pulses, positive carry clear pulses which may be generated by a separate off-beat pulse source 79 are directed upwardly over line 80 to the control grid of a trigger tube 81 and thence from the plate of tube 81 to the control grid of carry flip-flop tube 73. If tube 73 is conducting, indicating the storage of a digit to be carried over, the negative pulse from trigger tube 81 returns tube 73 to a non-conducting condition, thereby returning the carry flip-flop to a 0 condition and enabling the generation of a positive carry pulse from the plate of tube 73 over lines 82 and 83 to the suppressor grid of a carry gate tube 84. In addition the carry clear pulse over line 80 is simultaneously conducted downwardly over line 85 to the control grid of carry gate tube 84 thereby rendering gate tube 84 open and allowing this carry pulse to pass through to the plate of carry gate tube 84 and thence over line 86 to the add flip-flop tubes 68 and 69 of the next succeeding stage.

As discussed above, the isolation gate circuit, including tubes 77 and 78, is provided to enable the transfer and storage of a pulse from the add flip-flop to the carry flip-flop while isolating these circuits during the interstage carry-over operation. This transfer is performed for each second consecutive pulse received by the add flip-flop, as the conducting condition of tube 68, indicating the count of 1, is rendered non-conducting by the receipt of the second add pulse, thereby generating a positive pulse over line 87 to the control grid of gate tube 78. If associate gate tube 77 is then non-conducting, a negative pulse is transmitted from the plate of tube 78 thence to both control grids of carry flip-flop tubes over line 88 to render carry flip-flop tube 73 conducting and thereby store the carry pulse. During the interval before the next succeeding add pulse is received by the add flip-flop, this stored carry-over pulse is transferred to the next succeeding stage and the carry flip-flop is simultaneously returned to its 0 condition (tube 74 conducting). The positive carry clear pulse from off-beat source 79 effecting this transfer is also employed to simultaneously close gate tube 78 during the carry-over operation by being directed downwardly over lines 85 and 89 to the control grid of tube 77, thereby rendering tube 77 conducting. As tube 77 conducts, the current flowing through cathode resistor 90, common to tubes 77 and 78, provides a negative bias cutting off conduction of gate tube 78, thereby isolating the add flip-flop from the carry flip-flop during the interstage carry-over operation.

The interstage carry-over pulse being conducted over line 86 of one stage to the add flip-flop of the next succeeding stage reverses the then conducting condition of this latter flip-flop. However, should the add flip-flop of the next succeeding stage have a pulse stored therein or be in the 1 condition (tube 68 conducting), the receipt of the carry-over pulse results in the return of this flip-flop to the 0 condition (tube 69 conducting) and the generation of a second positive carry-over from the plate of tube 68 of this next stage. This second carry-over pulse is then propagated over lines 91 and 83 to the suppressor grid of carry gate tube 84, resulting in the transfer of this second carry pulse to the next in line succeeding stage in the same manner as the first carry-over pulse. Such a transfer cannot take place at any time other than during interstage carry-over since the carry gate tube 84 is non-conducting until receiving an offbeat or carry clear pulse over line 85 to its control grid that operates to render the tube conducting and allows the impulses subsequently received over line 83 to be conducted through the tube grid and plate upwardly and outwardly over line 27.

The remaining functions of complementing and clearing the various stages of the accumulator are rather simply performed by this preferred circuitry inasmuch as deriving the complement of a binary number involves merely reversing the conducting condition of the add flip-flop tubes; and the operation of clearing all of these stages involves merely returning all add flip-flops to the 0 condition (tube 69 conducting). To therefore reverse the conducting condition of the add flip-flops and thereby establish the complement of the number standing in the accumulator, it is only necessary to generate an additional pulse to the add flip-flops of each stage, resulting in these flip-flops reversing their then conducting condition, i. e., the stages then in the 0 condition being changed to the one condition and those in the one condition being changed to the 0 condition. As shown, this is performed by simultaneously directing this complement pulse from line 28 to line 92 where it is directed to the mixer tube 70 of each stage and thence to the add flip-flops reversing the condition thereof. During this complementing operation, it is of course necessary to prevent any transfer of pulses from the add flip-flop to the carry flip-flop that normally occurs as the add flip-flop is changed from a count of 1 to a count of zero. For this purpose, the complementary pulse over line 92 is additionally directed upward over line 94 to the control grid of gate tube 77, thereby closing this gate and effectively isolating the add flip-flop from the carry flip-flop to prevent any carry-over therebetween.

For clearing all stages to the zero condition after the completion of all operations, a similar procedure is employed. However, the positive clear pulse generated over line 29 is directed upwardly over line 93 and through clear gate tube 95 to the control grid of add flip-flop tube 68 alone, rather than jointly to the control grids of both add flip-flop tubes 68 and 69. By being directed to only tube 68, this connection insures that only tube 68 is rendered non-conductive and consequently establishes conduction through tube 69 (zero condition tube) in all stages of the accumulator. Again, this clear pulse is additionally directed upwardly to the control grid of gate tube 77 over line 150, thereby closing this gate and effectively isolating the add flip-flop tubes 68 and 69 from the carry flip-flop tubes 73 and 74 to prevent any carry-over impulse therebetween.

*Number generators and counters therefor*

The number generators 12, 13, 14, and 15, as shown, are preferably comprised of single tube cathode follower circuits having the control grid elements thereof connected in sequence to output lines 30, 31, 32, and 33, respectively, of selector matrix 45, and having the cathode elements thereof each connected with the inputs of a predetermined array of accumulator stages through the one way rectifier lines 16. For each input pulse directed from the selector matrix 45 to the control grid of any one of these cathode follower tubes, pulses are accordingly transmitted from the corresponding cathode element thereof to the various stages of accumulator 10, as shown.

The pulse counters 17, 18, 19, and 20, for counting the number of operations of each number generator 12, 13, 14, and 15 may comprise any high speed pulse counting device known in the art; and as shown by Fig. 3, are preferably comprised of four cascaded stages of Eccles-Jordan connected triode vacuum tubes, each stage being responsive to carry over pulses from a preceding stage and being resettable to a zero condition by a resetting pulse received over line 63 from common reset line 62. Inasmuch as the circuitry and operation of these counters is well known in the present state of the art, a further description of these circuits is believed unnecessary.

Similarly matrices 34, 35, 36, 37 and 38 may comprise any of the well known circuitry for decimally indicating the count summed by counters 17, 18, 19 and 20; such as the 8 input line 10 output line matrix schematically illustrated by Fig. 3. In this arrangement, the on-off condition of each of the binary counter stages is translated to the combined decimal count thereof by connecting the plate circuit of each tube in a predetermined arrangement to the ten output lines of the matrix consecutively numbered 0 through 9 inclusive. As the stages sequentially vary their on-off condition in response to succeeding counts, each of the matrix output lines, in numerical order, is sequentially energized with a more positive voltage than the others; and by connecting individual neon lamps or other suitable indicators to each said line (not shown), the decimal count for each said condition is manifested by the energized indicator.

Although number generators and corresponding counters therefor may be provided for each integral tens number divisible into the original binary number, it is unnecessary to provide these devices for reducing the remaining binary number by the $10^0$ order, for the decimal number corresponding to this remainder may be obtained directly by means of an 8-input line, 10-output line matrix 38, similar to the matrices 34, 35, 36 and 37 discussed above. This simplification of structure is permissible for as may be recalled from the introductory discussion, the original binary number may be considered as a sum of individual binary numbers as follows:

Binary $(a\times 10^4)$+binary $(b\times 10^3)$+binary $(c\times 10^2)$+ *binary* $(d\times 10^1)$+binary $e$. Consequently when this binary sum has been divested of each of the addends $a$, $b$, $c$, and $d$, the remaining addend, binary $e$, may be converted directly to its decimal equivalent by connecting each of the first four stages of the accumulator **25*a*, 25*b*, 25*c* and 25*d* to the input of matrix 38 as shown by Fig. 5 through suitable gate circuits, generally designated 100**.

For purposes of simplification, the schematic circuitry for flip-flop circuits 37, 48, and 49; trigger circuit 65; delay circuit 55; gates 40, 41 and 42, and the "Or" circuit have not been separately shown and described. However, one shot multi-vibrators or other triggering devices (component 65), as well as delay networks (component 55) are well known in the electronic and computing arts, and the control flip-flop circuits 37, 48, and 49, and the various gate circuits 40, 41, 42, and "Or," may comprise circuitry similar to the double stability state counting stages **17*a* or 17*d* (shown by Fig. 3), and pentode gate 100**, as shown by Fig. 5, respectively.

Although for purposes of simplicity the above preferred embodiment of the invention has been disclosed, as a system for converting a relatively small binary number to its equivalent 5 place decimal number $a$, $b$, $c$, $d$, $e$, the capacity of this system, of course, is not limited to any such range of numbers; for by the addition of more stages to accumulator 10, more number generators and pulse counters therefor, and a greater capacity line selector, it is obvious that many infinitely larger binary numbers may be readily and substantially instantaneously converted to their decimal equivalents.

Furthermore, many variations to the specific circuitry illustrated and described may be readily made by those skilled in the art in accordance with the basic invention herein disclosed without departing from the spirit and scope of this invention, and therefore this invention is to be considered as limited only in accordance with the features thereof as set forth in the claims appended hereto.

What I claim as new and desire to secure by Letters Patent of the United States is:

1. A binary to decimal converter comprising an accumulator, means for entering impulses representing a binary number to be converted therein, a plurality of generators, each said generator operable to enter impulses representing the binary equivalent of a different integral power of the number 10 into said accumulator in subtractive relation with the number stored in said accumulator, means for sequentially energizing said generators in the reverse order of their magnitude for enabling each generator to repetitively perform a successive series of operations until the binary equivalent number generated thereby exceeds the remaining number stored in the accumulator, a plurality of order counters, each counter connected to sum the total number of operations of a different number generator, whereby upon completion of all generator operations the number standing in said counters represents the decimal equivalent of said binary number.

2. A binary to decimal converter comprising an accumulator for storing a binary notation, means for generating impulses representing the binary equivalent of a high order integral power of the number 10, means for repetitively diminishing said notation with said high order number in successive operations until said number exceeds the remaining accumulation, means for adding the total number of said operations, means for generating the binary equivalent of the next preceding lesser integral power of the number 10, means for repetitively diminishing said remaining accumulation with said lesser order binary number in successive operations until said lesser order number exceeds the second remaining accumulation, second counting means for summing the number of said operations, a plurality of additional generating means, each said means operable to generate the binary equivalent of the next lower integral powers of the number 10, means for sequentially reducing said second remaining accumulation by each of said generating means in turn in the reverse order of their magnitudes, the number of successive reducing operations by each power of 10 being variable and continued until the binary equivalent of said 10's integral numbers of each power exceeds the then remaining accumulation, and a plurality of counting means for individually summing the total number of operations of each of said plurality of generators, whereby upon completion of said reducing operations by all generators the decimal number standing in said counting means is representative of the decimally converted binary notation.

3. A binary to decimal converter comprising an accumulator, means for entering a binary number into said accumulator, means for establishing the complement of said number in said accumulator, a plurality of generators, each said generator operable to enter impulses representing the binary equivalent of a different integral power of 10 into said accumulator in additive relation with the number standing therein, means for repetitively energizing said generator entering the highest magnitude 10's number to perform a successive series of additions until the fixed binary number generated thereby exceeds the remaining number stored in the accumulator, means for causing said complementing means to establish the complement of said remaining number in the accumulator, means for repetitively energizing said second highest magnitude generator to perform a successive series of additions until the fixed binary number generated thereby exceeds the second remaining number then stored in the accumulator, means for causing said complementing means to establish the complement of said second remaining number in the accumulator, means for sequentially energizing said remaining generators in the reverse order of their magnitudes enabling each generator to repetitively perform a successive series of additions until the binary number generated thereby exceeds the number then standing in the accumulator, and means for causing said complementing means to establish the complement of the number standing in the accumulator after each generator has completed its series of additions whereby upon completion of all operations the number of additions performed by each generator represents the decimal digit of that order.

4. A binary to decimal converter comprising an accumulator, means for entering a binary number to be converted into said accumulator, a plurality of signal generators, each said generator operable to enter impulses representing the binary equivalent of a different integral power of 10 into said accumulator in subtractive relation with the number stored therein, means for sequentially energizing said signal generators in the reverse order of their magnitudes for enabling each generator in turn to repetitively perform a successive series of operations until the number generated thereby exceeds the remaining number stored in the accumulator, whereby upon completion of all subtractive operations the number of subtractions performed by each generator represents the decimal digit of that order of the decimal number.

5. A binary to decimal converter comprising an accumulator having a plurality of cascaded stages each of which completes its cycle of operations in two steps and each having separate inputs for enabling both the simultaneous entry of impulses representing a complete number in binary notation and the simultaneous addition thereto of other binary notations, a plurality of generators, each said generator operable to enter impulses representing the binary equivalent of a different integral power of 10 into the stages of said accumulator in additive relation with the number stored therein, means for sequentially energizing said generators in the reverse order of their magnitudes for enabling each generator to repetitively perform a successive series of operations until the binary equivalent number generated thereby exceeds the remaining number stored in the accumulator, a plurality of counters, each counter connected to sum the total number of operations of a different generator, whereby upon completion of all generator operations the number standing in said counters represents the decimal equivalent of said binary number, and means for establishing the complement of the number standing in the accumulator prior to the energization of each of said generators.

6. A binary to decimal converter comprising an accumulator having a plurality of cascaded stages each of which completes its cycle of operation in two steps and each having separate inputs for enabling both the simultaneous entry of impulses representing a complete number in binary notation and the simultaneous addition thereto of impulses representing other numbers in binary notation, means for entering a binary number to be converted into the stages of said accumulator, means for initially establishing the complement of said number in the accumulator, a plurality of generators, each said generator operable to enter impulses representing the binary equivalent of a different integral power of 10 into said accumulator in additive relation with the number stored therein, means for sequentially energizing said number generators in the reverse order of their magnitudes to enable each generator, in turn, to repetitively perform a successive series of additive operations until after an overdraft has been obtained, means responsive to each overdraft condition to establish the complement of the overdraft number in the accumulator prior to the energization of the next generator, and a plurality of counting means for individually summing the total number of operations of each of said generators, whereby upon completion of all said addition operations the decimal number standing in said counting means represents said decimally converted binary number.

7. A binary to decimal converter comprising an accumulator having a plurality of cascaded stages each of which completes its cycle of operation in two steps and each having separate inputs for enabling both the simultaneous entry of impulses representing complete number in binary notation, and the simultaneous addition thereto of impulses representing other binary notations, means for entering a binary number to be converted into the stages of said accumulator, means for generating impulses representing the binary equivalent of a high order integral power of 10, means for repetitively diminishing the binary number stored in the accumulator with said high order power in successive operations until said high order power exceeds the remaining accumulation, means for counting the total number of said operations, means for generating impulses representing the binary equivalent of the next preceding lesser integral power of 10, means for repetitively diminishing said remaining accumulation with said lesser magnitude binary equivalent number in successive operations until said lesser binary number exceeds a second remaining accumulation, second counting means for summing the total number of said operations, a plurality of additional generating means, each said means producing the binary equivalent of the next preceding lower integral powers of 10, means for sequentially reducing said second remaining accumulation by each of said generating means in turn, in the reverse order of their magnitude, the number of successive reducing operations by each power of 10 being variable and continued until the binary equivalent of said power of 10 number exceeds the then remaining accumulation, and a plurality of additional counting means for individually summing the total number of operations of each of said plurality of order generators, whereby upon completion of all said reducing generators, whereby upon completion of all said reducing operations the decimal number standing in said counting means is representative of the originally entered binary number.

8. A binary to decimal converter comprising an accumulator having a plurality of cascaded stages each of which completes its cycle of operation in two steps and each having separate inputs for enabling both the simultaneous entry of impulses representing a complete number in binary notation, and the simultaneous addition thereto of impulses representing other binary notations, means for entering a binary number into said accumulator, means for establishing the complement of said number in said accumulator, a plurality of generators, each said generator operable to transmit impulses representing the binary equivalent of a different integral power of 10 into said accumulator in additive relation with the number standing therein, means for repetitively energizing the highest magnitude generator to perform a successive series of additions until the fixed binary number generated thereby exceeds the remaining number stored in the accumulator, means for causing said complementing means to establish the complement of the then remaining number in the accumulator, means for repetitively energizing said second highest magnitude generator to perform a successive series of additions until the fixed binary number generated thereby exceeds the second remaining number then stored in the accumulator, means for causing said complementing means to establish the complement of said second remaining number in the accumulator, means for sequentially energizing said remaining generators in the reverse order of their magnitudes for enabling each generator to repetitively perform a successive series of additions until the binary number generated thereby exceeds the number then standing in the accumulator, and means for causing said complementing means to establish the complement of the number standing in the accumulator after each generator has completed its series of additions, whereby upon completion of all said additions the number of additions of each generator represents the decimal digit of that power of 10 in the decimally converted binary number.

9. A binary to decimal converter comprising an accumulator having a plurality of cascaded stages each of which completes its cycle of operation in two steps and each having separate inputs for enabling both the simultaneous entry of impulses representing a complete number in binary notation and the simultaneous addition thereto of impulses representing other binary notations, means for entering a binary number to be converted into the stages of said accumulator, a plurality of generators, each said generator operable to enter impulses representing the binary equivalent of a different integral power of 10 into the various stages of the accumulator in subtractive relation with the number stored therein, means for sequentially energizing said generators in the reverse order of their magnitudes for enabling each generator, in turn, to repetitively perform a successive series of subtractions until the binary equivalent number generated thereby exceeds the remaining number stored in the accumulator, whereby upon completion of all said reducing operations the number of subtractions of each generator represents the decimal digit of that power of 10 in the decimally converted binary number.

10. A binary to decimal converter comprising a complementing accumulator, means for entering a binary number to be converted into said accumulator, means for initially establishing the complement of said number in said accumulator, a plurality of impulse generators, each said generator operable to enter impulses representing the binary equivalent of a different integral power of 10 into said accumulator in additive relation with the number stored therein, means for sequentially energizing said generators in the reverse order of their magnitudes to enable each generator, in turn, to repetitively perform a successive series of additive operations until an overdraft has been obtained, means responsive to each overdraft to establish the complement of the overdraft number in the accumulator prior to the energization of the next generator, and a plurality of counting means for individually summing the total number of additions of each said number generators, whereby upon completion of all said addition operations the number standing in said counting means represents said desired decimal number.

11. A binary to decimal converter comprising an accumulator for storing a number in binary notation, a plurality of generating means, each said means producing inpulses in binary number notation of a different integral power of 10, means for sequentially reducing the binary notations stored in the accumulator by each of said generating means, in turn, in the reverse order of their magnitudes, the number of successive reducing operations by each said generating means being variable and continued until the binary equivalent of that integral power of 10 exceeds the then remaining accumulation, and a plurality of counting means for individually summing the total number of reductions of each of said plurality of generators, whereby upon completion of all said reducing operations the number standing in said counting means constitutes the desired decimal number.

12. A binary to decimal converter comprising an accumulator having a plurality of cascaded stages each adapted to complete a cycle of operations in two steps and each having separate inputs for enabling both the simultaneous entry of signals representing a complete number in binary notation and the simultaneous addition thereto of signals representing other binary notations, said accumulator stages being jointly responsive to an initiating signal to effect a complement of the number standing therein, and being operable to generate overdraft signals when a binary number entered therein exceeds the remaining accumulation, a multiple line selector having an input line and a plurality of output lines selectively connectable thereto in sequential order in response to said overdraft signals, each said output line being in circuit with different stages of said accumulator to enable the simultaneous entry of signals representing a different binary number therein, each said different binary number being equivalent to a different integral power of 10, and a programming circuit responsive to said initiating signal for enabling the repetitive energization of said line selector input line, thereby permitting each of said output lines, in turn, to sequentially and repetitively effect a successive series of binary number entries into said accumulator until overdraft obtains by enabling each overdraft pulse to select the next preceding line selector output line in step by step sequence; and in addition thereto responsive to each overdraft pulse to establish the complement of the overdraft number in the accumulator stages and upon receipt of the last overdraft pulse to terminate the energization of said line selector input line, reset said line selector to its initial position, and clear said accumulator.

13. A binary to decimal converter comprising an accumulator having a plurality of cascaded stages each adapted to complete a cycle of operations in two steps and each having separate inputs for enabling both the simultaneous entry of signals representing a complete number in binary notations and the simultaneous addition thereto of signals representing other binary notations, and all said stages being jointly responsive to an energizing signal for establishing the complement of the number standing therein, means for entering a binary number to be converted into said accumulator, an input control line adapted to be repetitively energized by a pulsating power source, a plurality of output control lines, each being connectable to a different plurality of said stages whereby energization thereof enables the entry into the accumulator of signals representing the binary number equivalent of a different integral power of 10, means responsive to each accumulator over-draft for establishing the complement of the number then standing in the accumulator and for thereafter selectively connecting the next succeeding output line in turn to the input line, and means responsive to an initiating signal for establishing the complement of said originally entered binary number and for enabling the energization of said input line and one of said output lines.

14. A binary to decimal converter comprising a complementing accumulator, means for entering signals representing a binary number to be converted into said accumulator, means for initially establishing the complement of said number in said accumulator, a plurality of signal generators, each said generator operable to enter signals representing the binary equivalent of a different integral power of 10 into said accumulator in additive relation with the number stored therein, means for sequentially energizing said number generators in the reverse order of their magnitudes for enabling each generator, in turn, to repetitively perform a successive series of additive operations until an overdraft has been obtained, said means including a multiple line selector having an input line connectable to an energy source and a plurality of output lines selectively connectable thereto, each of said output lines being in circuit with a different one of said generators, means responsive to each overdraft condition of said accumulator to selectively connect a different output line to the input line in step by step order, and means additionally responsive to each overdraft condition of the accumulator to establish the complement of the overdraft number therein.

15. A binary to decimal converter comprising an accumulator having a plurality of cascaded stages each adapted to complete a cycle of operations in two steps and each having separate inputs for enabling both the simultaneous entry of signals representing a complete number in binary notation and the simultaneous addition thereto of signals representing other binary notations, said accumulator stages being jointly responsive to an initiating signal to establish the complement of the number standing therein and being operable to generate overdraft pulses when a binary number entered therein exceeds the remaining accumulation, a multiple line selector having an input line and a plurality of output lines selectively connectable thereto in sequential order in response to said overdraft pulses, each said output line being in circuit with a different plurality of said accumulator stages to enable the simultaneous entry of signals representing the binary equivalent of a different integral power of 10 therein, and a programming circuit including a first means responsive to said initiating signal for enabling the energization of said input line by a pulsating energy source, and a second means responsive to each overdraft pulse for establishing the complement of the overdraft number in the accumulator stages, and responsive to the overdraft pulse occurring after the last of said output lines has been energized to terminate the energization of said line selector input line, reset said line selector to its initial position, and clear the stages of said accumulator.

16. A binary to decimal converter comprising an accumulator having a plurality of cascaded stages each adapted to complete a cycle of operations in two steps and each having separate inputs for enabling both the simultaneous entry of signals representing a complete number in binary notation and the simultaneous addition thereto of signals representing other binary notations, said stages being jointly responsive to an energizing signal for establishing the complement of the accumulated number therein, means for entering a binary number to be converted into said accumulator, an input line adapted to be repetitively energized by a pulsating power source, a plurality of output lines, each said output line being connectable to a different plurality of said stages whereby energization of each output line enables the entry of signals in binary number notation of a different integral power of 10 in the accumulator, means responsive to each accumulator overdraft for selectively connecting the next succeeding output line to the input line and for establishing the complement of the number then standing in the accumulator, means responsive to an initiating signal for establishing the complement of said originally entered binary number in the accumulator and for enabling the energization of one of said output lines through said input line, and a plurality of counting means for individually summing the total number of energizations of each said output lines, whereby upon completion of all energizations of said output lines the decimal number standing in said counting means constitutes the desired decimal representation.

17. A binary to decimal converter comprising a complementing accumulator, means for storing a binary number to be converted into said accumulator, means for initially establishing the complement of said number in said accumulator, a plurality of generators, each said generator operable to enter signals representing the binary equivalent of a different integral power of 10 into said accumulator in additive relation with the number stored therein, means for sequentially energizing said generators in the reverse order of their magnitudes to enable each generator, in turn, to repetitively perform a successive series of additive operations until an overdraft has been obtained, said means including a multiple line selector having an input line connectable to a recurring energy source and a plurality of output lines selectively connectable thereto, each of said output lines being in circuit with a different one of said generators, means responsive to each overdraft condition of said accumulator to selectively connect a different output line to said input line in step-by-step sequence, means additionally responsive to each overdraft condition of the accumulator to establish the complement of the overdraft number therein, and a plurality of counting means for individually summing the total number of operations of each said generators, whereby upon completion of all additive operations the number standing in the counting means constitutes the desired decimal representation.

18. In a system for dividing a given binary number by a plurality of binary numbers of diminishing value in step-by-step sequence, a complementing accumulator adapted to store signals representing a given binary, a plurality of number generators, each said generator operable to repetitively enter signals representing a different one of said binary numbers into said accumulator in additive relation with the number stored therein, means for sequentially energizing said number generators in the reverse order of their magnitudes for enabling each generator in turn to repetitively perform a series of additive operations until one operation after the number generated thereby exceeds the remaining number standing in the accumulator, means for establishing the complement of the number standing in the accumulator prior to the energization of each said number generators, a plurality of counters, each counter connected to sum the total number of operations of a different number generator, the counters totalizing the operations of the first energized generator, third energized generator and thereafter every oddly sequenced generator, commencing the totalizing operations with the count of 0 thence forwardly to 1, 2, 3, etc., and the counters totalizing the operations of the second energized generator, the fourth energized generator, and thereafter every evenly sequenced generator, commencing the totalizing operations with the count of 9 thence backwardly to 8, 7, 6, etc., whereby upon completion of all generator operations the number standing in said counters represents the desired quotient.

19. In a system for dividing a given binary number by a plurality of binary numbers of diminishing value in step-by-step sequence, wherein signals representing said binary number are stored in an accumulator and are sequentially and repetitively diminished by signal representing each of said binary numbers in turn in the reverse order of their magnitudes, each number being repetitively diminished therefrom in a series of consecutive operations until an overdraft has been obtained; a plurality of signal generators, each operable to enter signals representing one of said binary numbers into the accumulator in additive relation with the number stored therein, a plurality of counters, one associated with each said signal generators, and adapted to sum the number of consecutive operations thereof, the counters associated with the first highest magnitude number generator and every succeeding odd number generator adapted to sum the operations thereof commencing with the count of 0 and thence forwardly to 9, and the counters associated with the second highest number signal generator and every succeeding even number generator adapted to total the operations thereof commencing with the count of 9 and thence reversibly to 0, and means for establishing the complement of the number standing in the accumulator prior to the operation of each said number generator.

20. In a system for sequentially reducing a first given number represented in binary notation by a second, third, and other numbers in binary notation by complementary addition thereof, means for storing signals representing said given binary number and establishing the complement thereof, means for repetitively adding thereto signals representing said second number in a series of operations until the signals representing said second number exceeds resulting summation and thereafter performing one additional adding operation thereof, means for counting the number of said operations commencing with 0 and thence forwardly to 1, 2, etc., means for establishing the complement of the total summation, means for adding signals representing said third number thereto in a series of repetitive operations until said signals representing said third number exceeds the then resulting summation and thereafter performing one additional addition operation thereof, means for counting the number of said latter summations commencing with 9 and then reversedly to 8, 7, etc., means for establishing the complement of the then remaining summation, means for successively adding signals representing said other numbers in turn thereto in similar repetitive operations, the number of adding operations performed with each number being variable and continued for one operation after each said number exceeds the then remaining summation, and means for counting the number of additions performed by each number commencing with 0 forwardly to 1, 2, etc., for the fourth, sixth, and other evenly disposed additive numbers; and commencing with 9 reversedly to 8, 7, 6, etc., for the fifth, seventh and other oddly disposed additive numbers.

21. A binary to decimal converter comprising a complementing accumulator, means for entering a binary number to be converted into said accumulator, means for initially establishing the complement of said number in said accumulator, a plurality of signal generators, each said generator operable to enter signals representing the binary equivalent of a different integral power of 10 into said accumulator in additive relation with the number stored therein, means for sequentially energizing said signal generators in the reverse order of their magnitudes to enable each generator, in turn, to repetitively perform a successive series of additive operations until an overdraft has been obtained, a multiple line selector having an input line, a plurality of output lines selectively connectable thereto, and a plurality of pairs of control lines, a plurality of double stability state circuits interconnected in cascade arrangement, each circuit having a pair of output terminals energizing a different one of said pairs of control lines, each stability state arrangement of said plurality of control circuits controlling the connection of a different output line to the line selector input line, means responsive to an accumulator overdraft condition to vary the stability state conditions of said control circuits, and means additionally responsive to each accumulator overdraft condition to establish the complement of the overdraft number therein.

22. A binary to decimal converter comprising a complementing accumulator, means for entering a binary number to be converted into said accumulator, means for initially establishing the complement of said number in said accumulator, a plurality of signal generators, each said generator operable to enter signals representing the binary equivalent of a different integral power of 10 into said accumulator in additive relation with the number stored therein, means for sequentially energizing said number generators in the reverse order of their magnitudes to enable each generator in turn to repetitively perform a successive series of additive operations until an overdraft has been obtained, a multiple line selector having an input line, a plurality of output lines selectively connectable thereto, and a plurality of pairs of control lines; a plurality of double stability state circuits interconnected in cascade arrangement, each circuit having a pair of output terminals energizing a different one of said pairs of control lines wherein each stability state arrangement of said plurality of control circuits controls the connection of a different output line to the line selector input line, means responsive to an accumulator overdraft condition to vary the stability state conditions of said control circuits, means additionally responsive to each overdraft condition of the accumulator to establish the complement of the overdraft number therein; a plurality of counters, each counter connected to sum the total number of operations of a different number generator, the counters totaling the operations of the first energized generator, third energized generator and thereafter every oddly sequenced generator commencing with the count of 0 thence forwardly to 9, and the counters totalizing the operations of the second energized generator, the fourth energized generator and thereafter every evenly sequenced generator commencing with the count of 9 thence reversedly to 0.

23. A binary to decimal converter comprising a complementing accumulator, means for entering a binary number to be converted into said accumulator, means for initially establishing the complement of said number in said accumulator, a plurality of signal generators, each said generator operable to enter signals representing the binary equivalent of a different integral power of 10 into said accumulator in additive relation with the number stored therein, means for sequentially energizing said signal generators in the reverse order of their magnitudes to enable each generator in turn to repetitively perform a successive series of additive operations until an overdraft has been obtained, said means including a multiple line selector having an input line connectable to a recurring energy source and a plurality of output lines selectively connectable thereto, each of said output lines being in circuit with a different one of said generators, means responsive to each overdraft condition of said accumulator to selectively connect a different output line to the input line in step-by-step order, means additionally responsive to each overdraft condition of the accumulator to establish the complement of the overdraft number therein, a plurality of counters, each counter connected to sum the total number of operations of a different signal generator the counters totaling the operations of the first energized generator, third energized generator and thereafter every oddly sequenced energized generator commencing with the count of 0 thence forwardly to 9, and the counters totalizing the operations of the second energized generator, the fourth energized generator, and thereafter every evenly sequenced generator commencing with the count of 9 thence reversedly to 0.

24. In a device for converting a number expressed in a first radix to that of a second radix, an accumulator having a plurality of cascaded stages, one for each integral power of the first radix base, means for storing the number to be converted in said accumulator, a plurality of transmitters, one for each integral power of a second radix base, each said transmitter being in circuit with different ones of said accumulator stages to subtractively enter signals therein representing the first radix form of that integral power of the second radix, means for repetitively energizing each of said generators in the reverse order of their magnitudes with each generator being energized a repetitive number of instances until the magnitude of the signal generated thereby exceeds the magnitude of the number then standing in the accumulator, and means for counting the number of instances that each generator is energized.

25. A binary to decimal converter comprising an accumulator, means for entering impulses therein representing a binary number to be converted, a plurality of electronic generators, each said generator operable to enter impulses representing the binary equivalent of a different integral power of the number 10 into said accumulator in subtractive relation with the number stored in said accumulator, means for sequentially energizing said electronic generators in the reverse order of their magnitudes for enabling each generator to repetitively perform a successive series of operations until the binary number generated thereby exceeds the remaining number stored in the accumulator, a plurality of electronic counters, each counter connected to sum the total number of operations of a different electronic generator, whereby upon completion of all generator operations the number standing in said counters represents the decimal equivalent of said binary number.

26. A radix converter comprising an accumulator for storing a number expressed in a first radix, means for generating impulses representing the first radix equivalent of a high order integral power of a second radix base, means for repetitively diminishing said stored number with said high order impulses in successive operations until said generated impulses exceed the remaining accumulation, means for adding the total number of said operations, means for generating the first radix equivalent of the next preceding lesser order integral power of the second radix base, means for repetitively diminishing said then remaining accumulation with said lesser order impulses in successive operations until said lesser order impulses exceed the second remaining accumulation, second counting means for summing the number of said operations, a plurality of additional generating means, each said means operable to generate the first radix equivalent of the next lower integral powers of the second radix base, means for sequentially reducing said then remaining accumulation by each of said generating means in turn in the reverse order of their magnitudes, the number of successive reducing operations by each generator being variable and continued until the number represented by the impulses transmitted by each generator exceeds the number then remaining in the accumulator, and a plurality of counting means for individually summing the total number of operations of each of said plurality of generators, whereby upon completion of said reducing operations by all generators the number standing in said counting means is representative of the second radix form of the originally entered first radix number.

27. A radix converter comprising an accumulator, means for entering a number expressed in a first radix into said accumulator, means for establishing a complement of said number in said accumulator, a plurality of generators, each generator operable to additively enter impulses into said accumulator in the first radix form that are equal in magnitude to a different integral power of a second radix base, means for repetitively energizing said highest magnitude generator to perform a successive series of additions until the number generated thereby exceeds the then remaining number stored in the accumulator, means for causing said complementing means to establish the complement of said remaining number in the accumulator, means for repetitively energizing said second highest magnitude generator to perform a successive series of additions until the number generated thereby exceeds the second remaining number then stored in the accumulator, means for causing said complementing means to establish a complement of said second remaining number in the accumulator, means for sequentially energizing said remaining generators in the reverse order of their magnitudes enabling each generator to repetively perform a successive series of additions until the number generated thereby exceeds the number then standing in the accumulator, and means for causing said complementary means to establish the complement of the number standing in the accumulator after each generator has completed its series of additions.

28. A radix converter comprising an accumulator having a plurality of cascaded stages, one for each integral power of a first radix base, means for entering a number expressed in the first radix to be converted into the stages of said accumulator, means for initially establishing a complement of said number in the accumulator, a plurality of generators, each said generator operable to transmit impulses in the first radix form having a value equal to a different integral power of a second radix base, means conducting said impulses into said accumulator in additive relation with the number stored therein, means for sequentially energizing said generators in the reverse order of their magnitudes to enable each generator, in turn, to repetitively perform a successive series of additive operations until after an overdraft has been obtained, means responsive to each overdraft condition to establish the complement of the overdraft number in the accumulator prior to the energization of the next generator, and a plurality of counting means indicating in the second radix for individually summing the total number of operations of each of said generators.

29. A radix converter comprising an accumulator having a plurality of cascaded stages, one for each integral power of a first radix base, said accumulator stages being jointly responsive to an initiating signal to effect a complement of the number standing therein and being operable to generate overdraft signals when a number entered therein exceeds the remaining accumulation, a multiple line selector having an input line and a plurality of output lines selectively connectable thereto in sequential order in response to said overdraft signals, each said output line being in circuit with different stages of said accumulator to enable the entry therein of signals representing a different fixed number expressed in the first radix form, each said different fixed number being equal in magnitude to a different integral power of a second radix base, and a programming circuit responsive to said initiating signal for enabling the repetitive energization of said line selector input line, thereby permitting each of said output lines, in turn, to sequentially and repetitively effect a successive series of entries into said accumulator until overdraft attains by enabling each overdraft pulse to select the next preceding line selector input line in step by step sequence; said programming circuit being additionally responsive to the last overdraft pulse to terminate the energization of said line selector input line, reset said line selector to its initial position, and clear said accumulator.

30. A radix converter comprising a complementing accumulator, means for generating signals into said accumulator representing a number expressed in the first radix, means for initially establishing the complement of said number in said accumulator, a plurality of signal generators, each said generator operable to transmit fixed signals in the form of the first radix that are equal in value to a different one of the integral powers of a second radix base, means conducting the signals from each generator to the accumulator in additive relation with the number stored therein, means for sequentially energizing said generators in the reverse order of the magnitudes of their fixed numbers for enabling each generator, in turn, to repetitively perform a successive series of additive operations until an overdraft has been obtained, said means including a multiple line selector having an input line connectable to an energy source and a plurality of output lines selectively connectable thereto, each of said output lines being in circuit with a different one of said generators, means responsive to each overdraft condition of said accumulator to selectively connect a different output line to the input line in step by step sequence, and means additionally responsive to each overdraft condition of the accumulator to establish the complement of the overdraft number therein.

31. In an all electronic radix converter an accumulator having a plurality of registering means, one for each power of a first radix base and each having separate inputs enabling the simultaneous entry of signals representing a complete number in the first radix notation and the simultaneous addition thereto of signals representing other numbers in the first radix notation, and all of said registering means being jointly responsive to an energizing signal for establishing the complement of the accumulated number therein, means for entering a given number expressed in the first radix notation into said accumulator, an input line adapted to be repetitively energized by a pulsating power source, a plurality of output lines, each said output lines being connectable to a different preselected ones of said registering means whereby energization of each output line enables the entry therein of fixed signals in first radix notation equal in value to a different integral power of a second radix base number, means responsive to each accumulator overdraft for selectively connecting the next succeeding output line to the input line and for establishing the complement of the number then standing in the accumulator, means responsive to an initiating signal for establishing the complement of said given number in the accumulator and for enabling the energization of one of said output lines through said input line, and a plurality of counting means for individually summing the total number of energizations of each said output lines.

32. In a system for dividing a given number expressed in a first radix notation by a plurality of other numbers expressed in the first radix notation, wherein said other numbers are of progressively diminishing magnitudes, a complementing accumulator adapted to store signals representing the given number, a plurality of electronic generators, each said generator operable to repetitively enter signals into said accumulator representing a different one of said other numbers in additive relation with the number stored therein, means for sequentially and repetitively energizing said generators in the reverse order of their magnitudes for enabling each said generator, in turn, to repetitively perform a series of additive operations until one operation after the number generated thereby exceeds the remaining number standing in the accumulator, means for establishing the complement of the number standing in the accumulator prior to the energization of each said generator, a plurality of counters, each counter connected to sum the total number of operations of a different generator, the counter totalizing the operations of a first energized generator, third energized generator, and thereafter very oddly energized generator, indicating the totalizing operations with the initial count of zero, thence forwardly to 1, 2, 3, etc., and the counters totalizing the operations of the second energized generator, the fourth energized generator, and thereafter every evenly energized generator, indicating the totalizing operations with the initial count of 9 and thence backwardly to 8, 7, 6, etc., whereby upon completion of all generator operations the number standing in said counters represents the desired quotients.

33. In a system for dividing a given number by a plurality of fixed numbers of progressively diminishing value in step-by-step sequence, wherein signals representing said given number are stored in an accumulator and are sequentially and repetitively diminished by signals representing each of said fixed numbers, in turn, in the reverse order of their magnitudes, each fixed number being repetitively diminished therefrom in a series of consecutive operations until an overdraft has been obtained; a plurality of signal generators, each operable to transmit signals representing one of said fixed numbers into the accumulator in additive relation with the number stored therein, a plurality of counters, one associated with each said signal generator, and adapted to sum the number of operations thereof, the counters associated with the first highest magnitude number generator and every succeeding odd number generator adapted to sum the total number of operations thereof commencing with the count of 0 and thence forwardly to 9, and the counters associated with the second highest magnitude generator and every succeeding even number generator adapted to total the number of operations thereof commencing with the count of 9 and thence reversely to 0, and means for establishing the complement of the number standing in the accumulator prior to the operation of each said generator.

34. In a system for sequentially reducing a first given number represented in a first radix by a second, third, and other numbers in the first radix by complementary addition thereof, means for storing signals representing said given number and establishing the complement thereof, means for repetitively adding signals representing said second number thereto in a series of operations until the signals representing said second number exceeds the resulting summation and thereafter performing one additional adding operation thereof, means for counting the number of said operations and indicating the count in a preselected radix commencing with 0 and thence forwardly to the highest digit of the preselected radix, means for establishing the complement of this first total summation, means for adding signals representing said third number thereto in a series of repetitive operations until said signals representing said third number exceed the then remaining summation and thereafter performing one additional adding operation thereof, means for counting the number of said latter summations and indicating the count in said preselected radix commencing with the highest digits of the preselected radix and thence reversely toward zero, means for establishing the complement of this latter remaining summation, means for successively adding signals representing said other numbers, in turn, thereto in similar repetitive operations, the number of adding operations performed with each number being variable and continued for one operation after each said number exceeds the then remaining summation, and means for counting the number of additions performed by each number and indicating said count in the preselected radix commencing with 0 and thence forwardly, for the fourth, sixth, and other evenly disposed additive numbers; and commencing with the highest digit of the preselected radix and thence reversely toward 0 for the fifth, seventh, and every oddly disposed additive number.

35. A radix converter comprising a complementing accumulator, means for entering a number expressed in a first radix to be converted into said accumulator, means for initially establishing the complement of said number in said accumulator, a plurality of signal generators, each said generator operable to enter signals representing the first radix equivalent of a different integral power of a second radix into said accumulator in additive relation with the number stored therein, means for sequentially energizing said signal generators in the reverse order of their magnitudes to enable each generator, in turn, to repetitively perform a successive series of additive operations until an overdraft has been obtained, a multiple line selector having an input line and a plurality of output lines selectively connected thereto in response to different energizations of a plurality of pairs of control lines, a plurality of double stability state circuits interconnected in cascade arrangement, each circuit having a pair of output terminals energizing a different one of said pairs of control lines, each stability state arrangement of said plurality of control circuits controlling the connection of a different output line to the line selector input line, means responsive to an accumulator overdraft condition to vary the stability state conditions of said cascaded circuits, and means additionally responsive to each accumulator overdraft condition to establish the complement of the overdraft number therein.

References Cited in the file of this patent

UNITED STATES PATENTS

| | | |
|---|---|---|
| 2,444,042 | Hartley et al. | June 29, 1948 |
| 2,570,716 | Rochester | Oct. 9, 1951 |
| 2,620,974 | Valtat | Dec. 9, 1952 |